(12) United States Patent
Hsieh

(10) Patent No.: US 6,881,884 B2
(45) Date of Patent: Apr. 19, 2005

(54) GUITAR STAND

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 86 days.

(21) Appl. No.: 10/621,349

(22) Filed: Jul. 18, 2003

(65) Prior Publication Data

US 2005/0011337 A1 Jan. 20, 2005

(51) Int. Cl.⁷ .................................. G10D 3/00
(52) U.S. Cl. ...................... 84/327; 84/329; 84/421
(58) Field of Search ...................... 84/327, 329, 421

(56) References Cited

U.S. PATENT DOCUMENTS 6,005,176 A * 12/1999 Yu ........................ 84/327
6,127,612 A * 10/2000 Yu ........................ 84/327
6,204,440 B1 * 3/2001 Yu ........................ 84/327

* cited by examiner

Primary Examiner—Shih-Yung Hsieh
(74) Attorney, Agent, or Firm—Dennison, Schultz, Doughty & McDonald

(57) ABSTRACT

A guitar stand includes a lower bracket formed on a lower part of a body. A tube is mounted at an upper part of the body. A shaft is longitudinally received in the tube and extends in a hollow seat. A handle is formed on the shaft and upright extends through a channel in the shaft. A resilient member is provided outside the shaft. Two levers each have a pivot hole and a slot defined therethrough. A fastener is inserted through the slots to fasten the shaft between the levers. Two pivot pins are respectively inserted in the pivot holes and the seat to pivotally mount the levers in the seat. Two arcuate arms are respectively provided at distal ends of the levers. By pushing the handle along the channel, the arcuate arms can be temporarily opened for clamping a neck of a guitar.

3 Claims, 8 Drawing Sheets

GUITAR STAND

BACKGROUND OF THE INVENTION

1. Field of the Invention

The present invention is related to a musical instrument stand, and more particularly to a guitar stand which is easy to operate.

2. Description of Related Art

Referring to FIG. 7, a conventional guitar stand has a lower bracket (60) for supporting a bottom of a guitar. A U-shaped upper bracket (62), in which a neck of the guitar can be received, is formed at a tube (61) provided on the stand. However, the guitar is not stably fixed on the stand and often falls from the stand when someone touches the guitar or passes the stand carelessly.

Referring to FIG. 8, another conventional guitar stand also has a lower bracket (70) for supporting the bottom of the guitar. A tube (71) is provided on the stand and a seat (72) is provided at a distal end of the tube (71). Two arms (74) are pivotally mounted on the seat (72), and two handles (73) are provided at a side of the seat (72) opposite to the arms (74) for controlling the arms (74) to open/close. The guitar can be stably fixed on the stand by the neck of the guitar being clamped by the arms (74).

However, for positioning the neck of the guitar, the handles (73) must be gripped to open the arms (74), which is inconvenient for a user. Furthermore, the stand has an ugly appearance because of the handles (73) protruding from the seat (72).

Therefore, the invention provides a guitar stand to mitigate and/or obviate the aforementioned problems.

SUMMARY OF THE INVENTION

The main objective of the invention is to provide a guitar stand which is convenient to operate.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
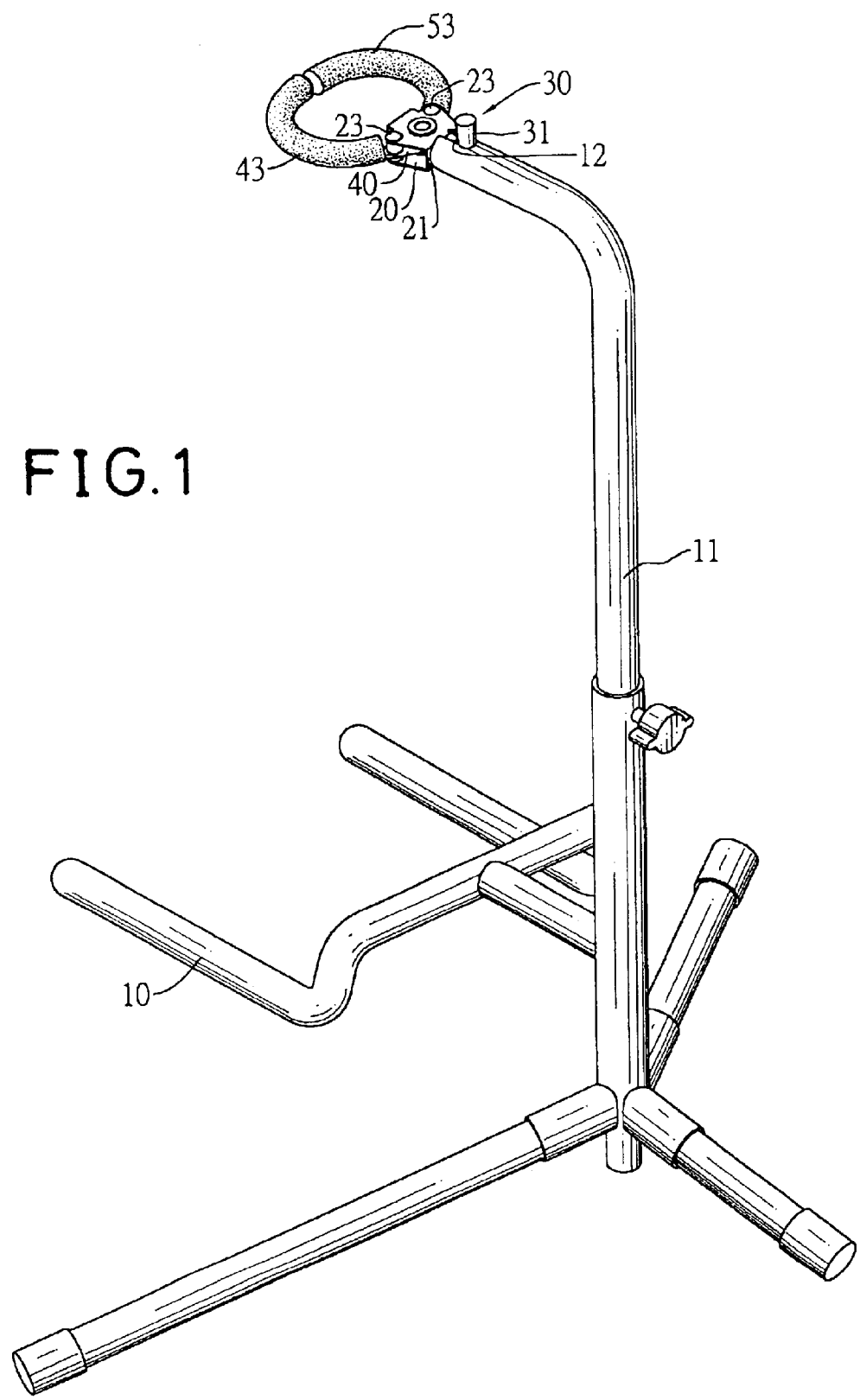
FIG. 1 is a perspective view of a guitar stand in accordance with the invention.
Figure 2:
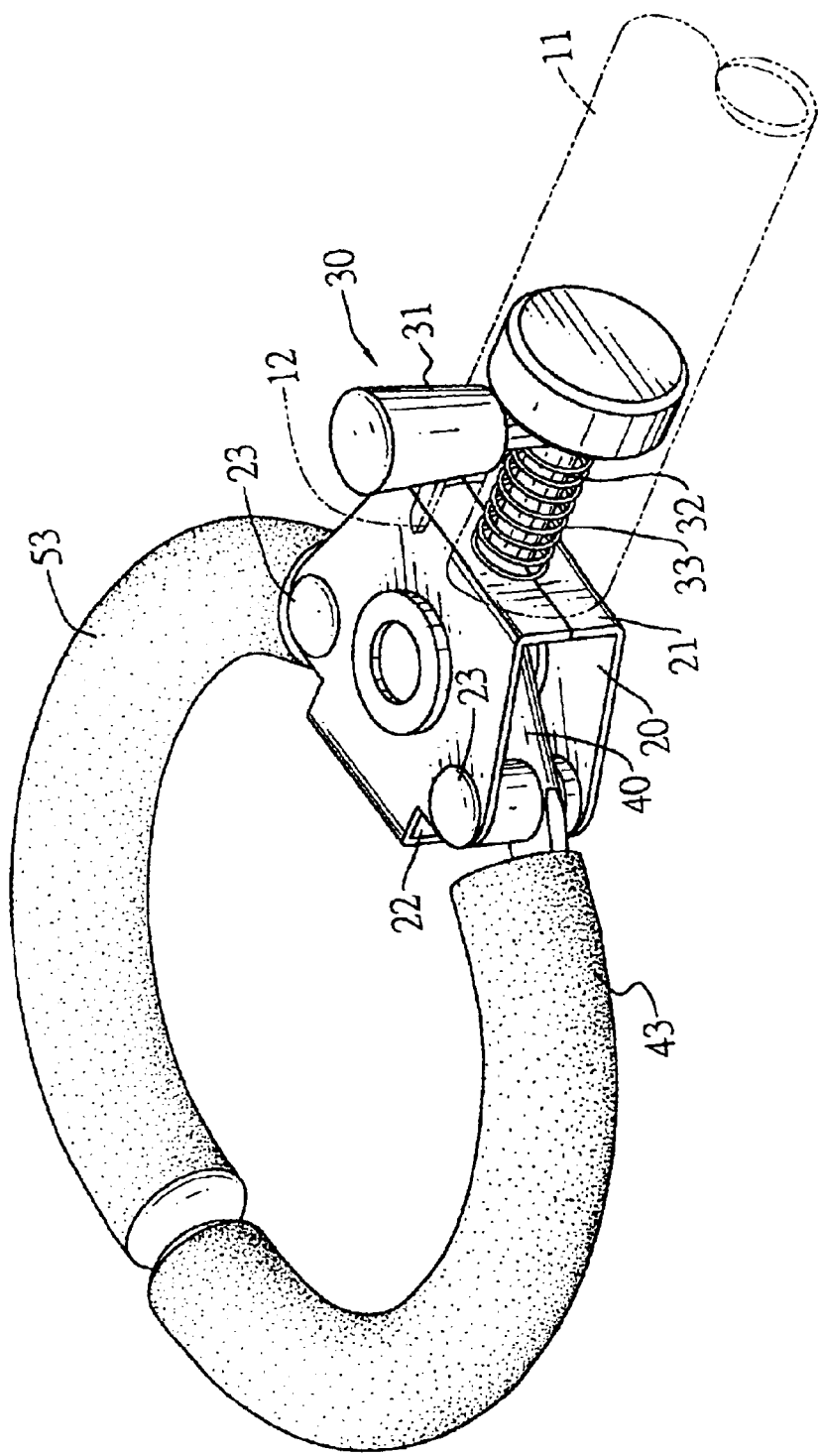
FIG. 2 is a partial perspective view of the guitar stand in accordance with the invention.
Figure 3:
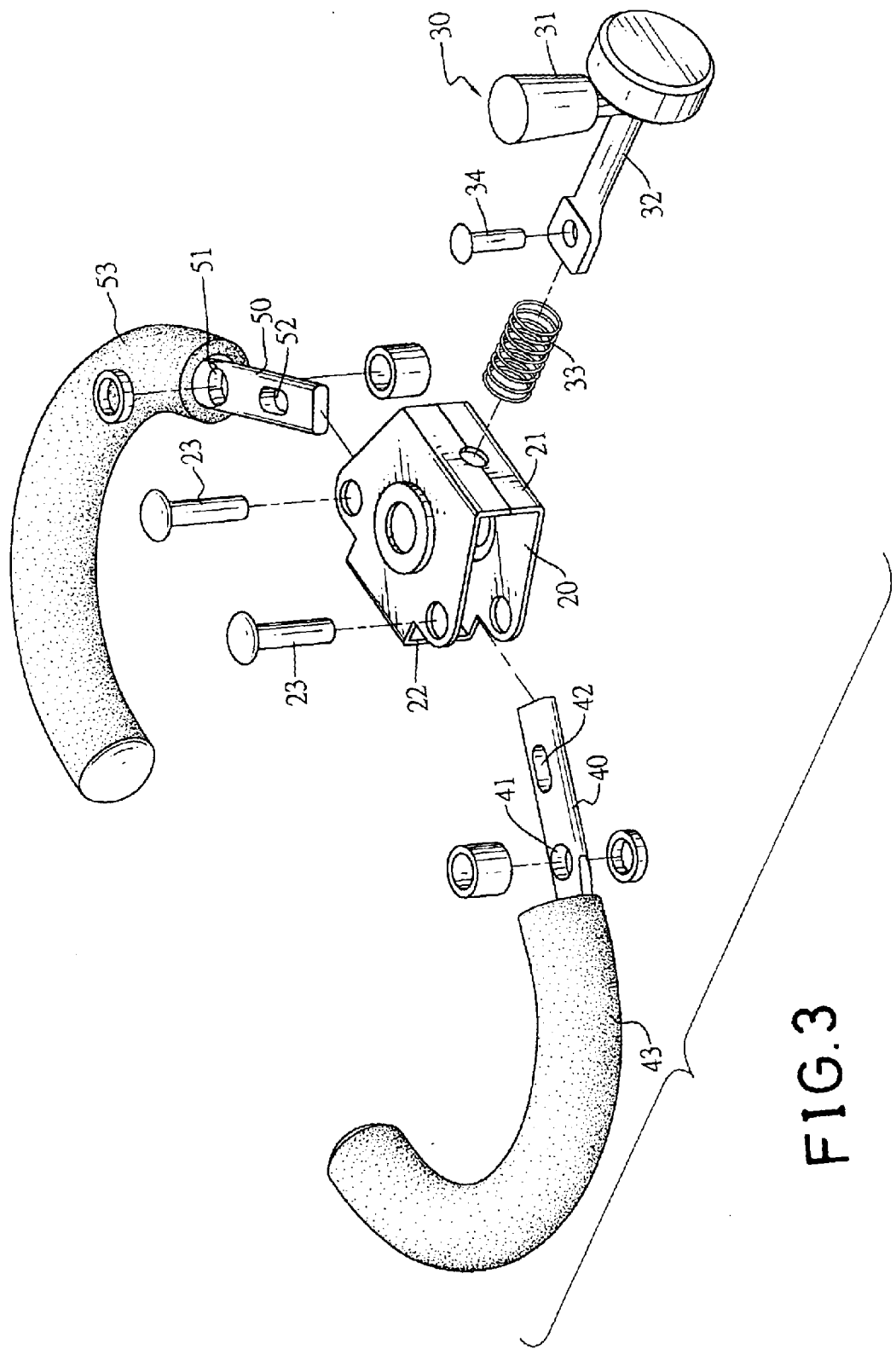
FIG. 3 is an exploded perspective view of FIG. 2.

Referring to FIGS. 1–3, a self-closing guitar stand in accordance with the invention has a lower bracket (10) extended from a lower part of a body (not numbered). An L-shaped tube (11) is adjustably mounted at an upper part of the body, and a channel (12) is defined at a free end of the L-shaped tube (11).

A hollow seat (20) has a first plate (21) abutting the free end of the tube (11) and a second plate (22) opposite to the first plate (22). Two openings (not numbered) are respectively defined at two sides between the first plate (21) and the second plate (22).

A shaft assembly (30) is provided between the first plate (21) and the tube (11). The shaft assembly (30) has a shaft (32) longitudinally and movably received in the tube (11). A free end of the shaft (32) extends into the hollow seat (20) and is fastened by a fastener (34). A handle (31) is formed on the shaft (32) and uprightly extends through the channel (12). The shaft (32) is provided with a resilient member (33) between the handle (31) and the seat (20).

Two levers (40, 50) are pivotally and respectively mounted at two sides of the seat (20). The levers (40, 50) each have a pivot hole (41, 51) and a slot (42, 52) defined therethrough. The levers (40, 50) respectively extend through the openings and are connected together in the seat (20), one above the other. The shaft (32) is fitted between the levers (40, 50), and the fastener (34) is inserted through the slots (42, 52) of the levers (40, 50).

Two pivot pins (23) are respectively inserted in the pivot holes (41, 51) and the seat (20) to pivotally mount the levers (40, 50) in the seat (20). Two arcuate arms (43, 53) are respectively provided at distal ends of the levers (40, 50) to form a closeable ring.

Figure 4:
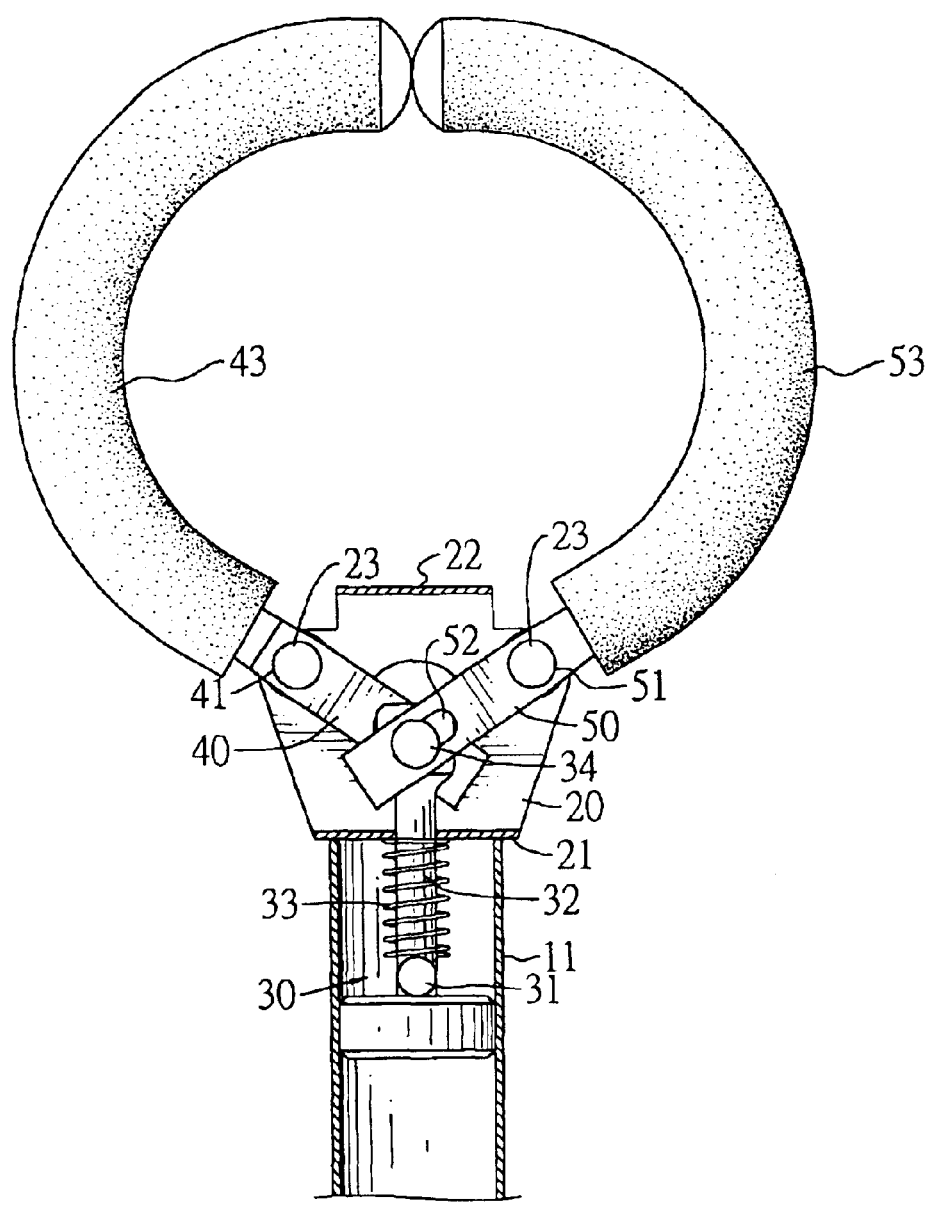
FIG. 4 is a top sectional view of FIG. 2.
Figure 5:
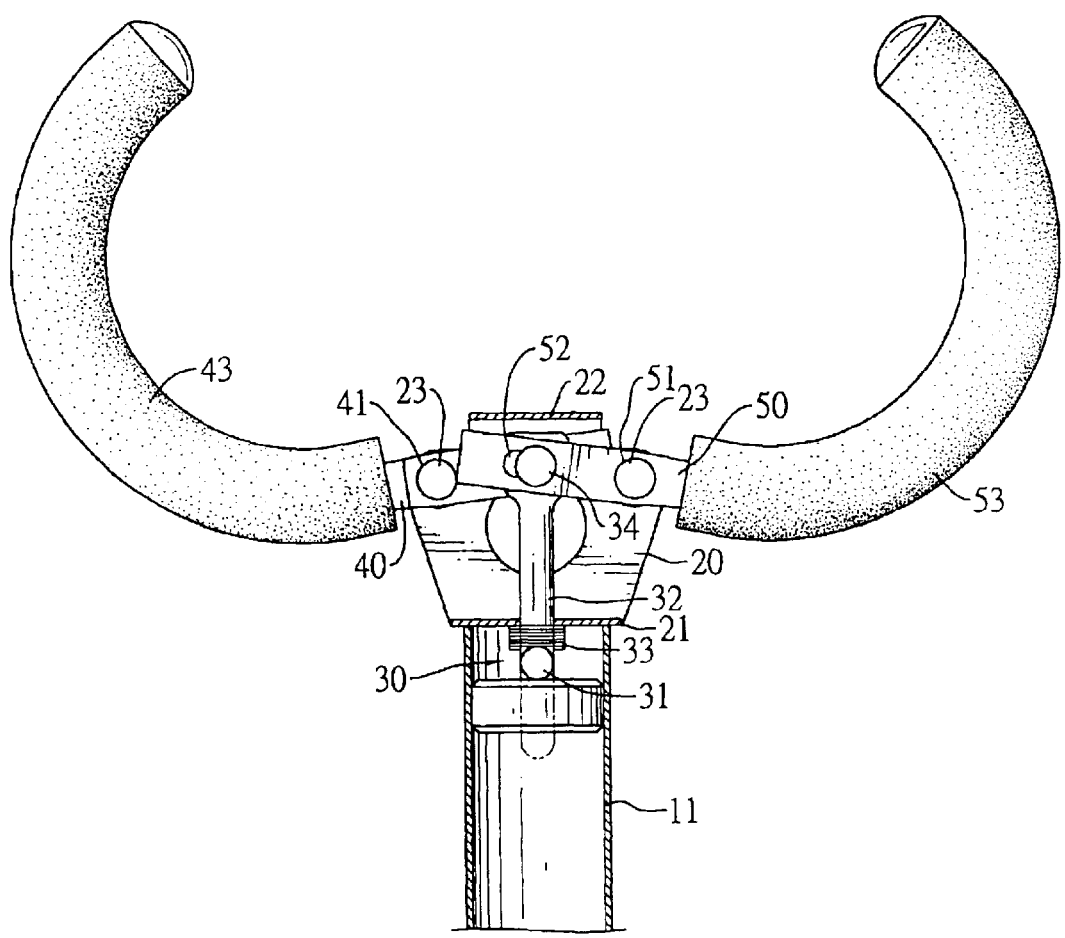
FIG. 5 is a top sectional view of FIG. 2 in a status of arcuate arms being opened.
Figure 6:
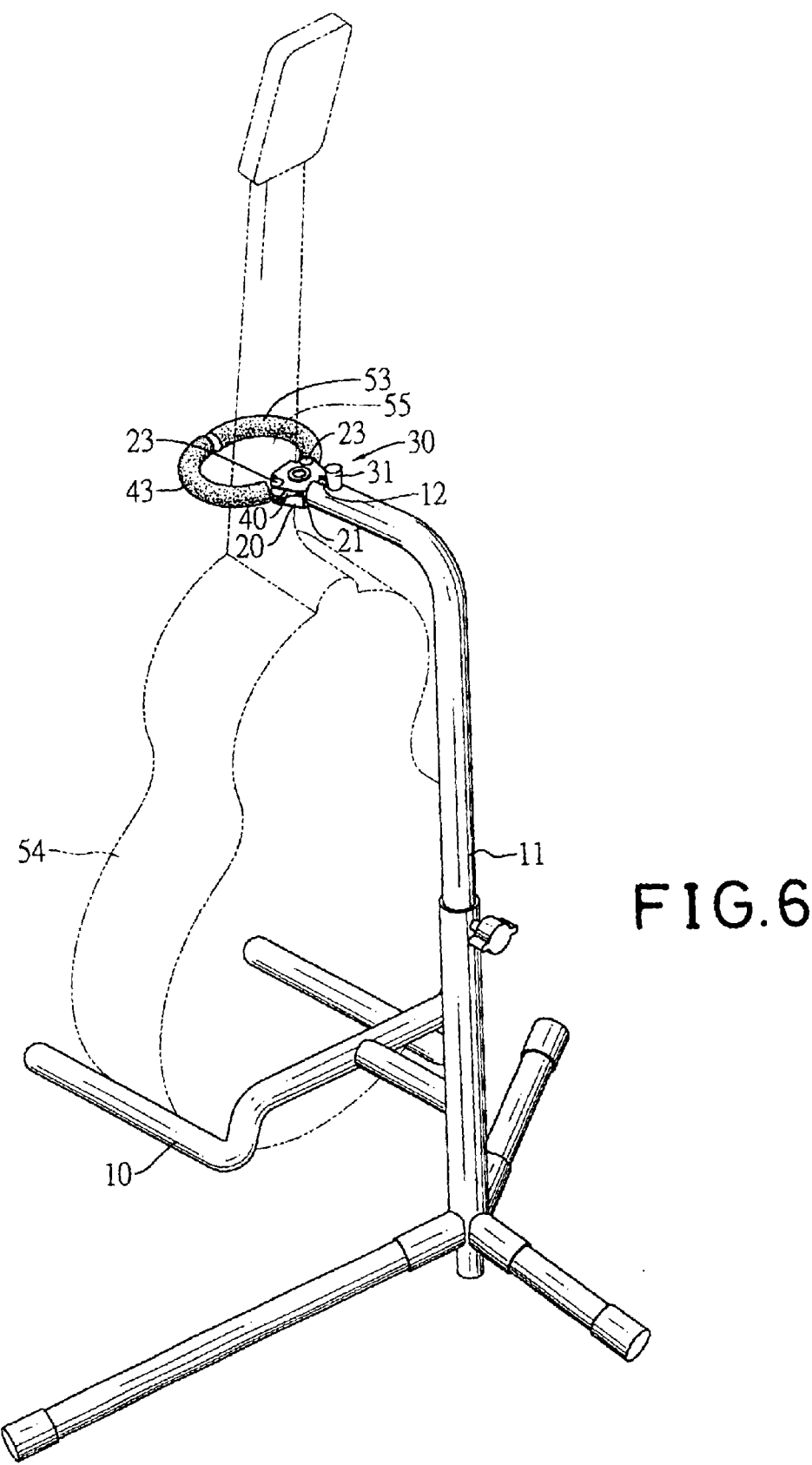
FIG. 6 is a perspective view of a guitar fixed on the guitar stand in accordance with the invention.
Figure 7:
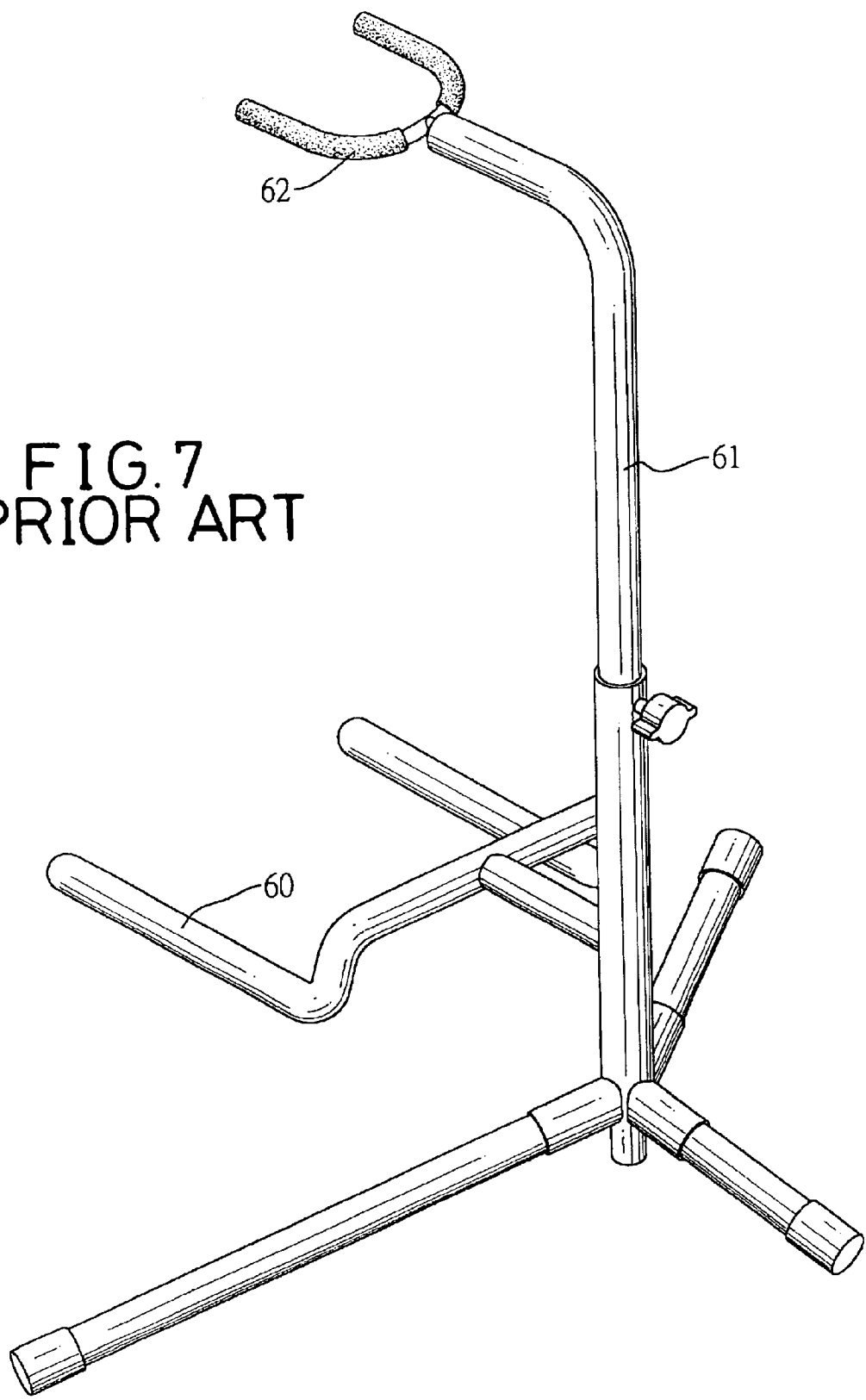
FIG. 7 is a perspective view of a first conventional guitar stand.
Figure 8:
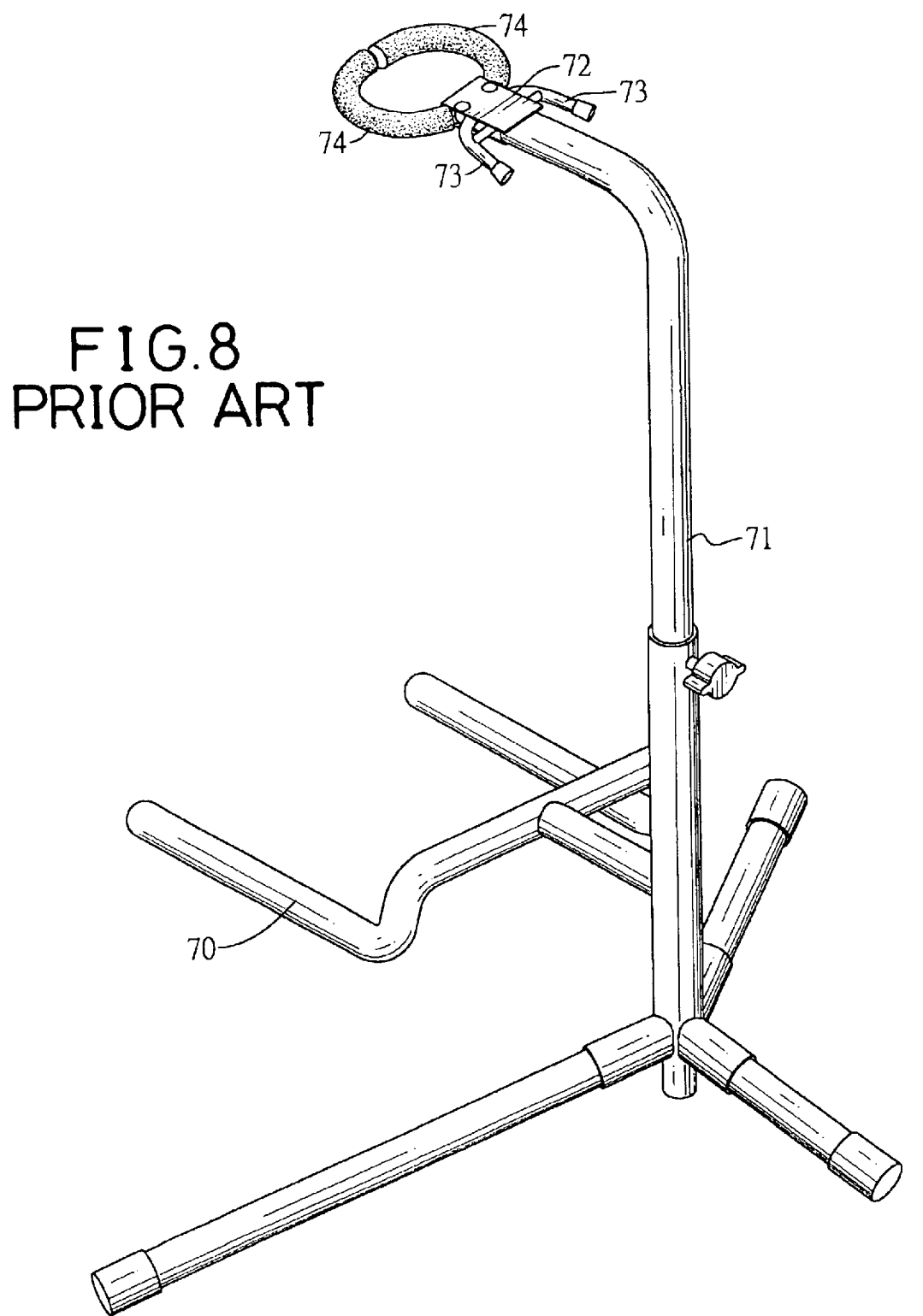
FIG. 8 is a perspective view of a second conventional guitar stand.

Referring to FIGS. 4–6, for positioning a guitar (54), a user can push the handle (31) along the channel (12) to move the shaft (32) towards the seat (20), and the levers (40, 50) are respectively pivoted about the pivot pins (23) to open the closeable arms (43, 53) while the resilient member (33) is compressed. Thus, a neck (55) of the guitar (54) can be located in the arms (43, 53) and a bottom of the guitar (54) can be supported on the lower bracket (10). When the handle (31) is released, the shaft (32) will return to the original position under the force of the compressed resilient member (33), and the arms (43, 53) close again to clamp the neck (55). Therefore, the guitar (54) is stably fixed on the stand.

Thus, it is very convenient for the user to open the arcuate arms by pushing the handle along the channel. Furthermore, there is no element obviously protruded from the seat or the tube, so that the guitar stand has an attractive appearance.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A guitar stand comprising:

a body;

a lower bracket (10) formed on a lower part of the body;

a tube (11) mounted at an upper part of the body, and having a channel (12) defined at a free end of the tube (11);

a hollow seat (20) having a first plate (21) abutting against the free end of the tube (11), a second plate (22) opposite to the first plate (21), and two openings respectively defined at two sides between the first plate (21) and the second plate (22);

a shaft assembly (30) provided between the first plate (21) and the tube (11), and having a shaft (32) longitudinally and movably received in the tube (11) with a free end extending into the hollow seat (20) and fastened by a fastener (34), a handle (31) formed on the shaft (32) and uprightly extending through the channel (12), and a resilient member (33) provided outside the shaft (32) and between the handle (31) and the seat (20);

two levers (40, 50) respectively extending through the openings and connected together in the seat (20) one lever above the other, each lever (40, 50) having a pivot hole (41, 51) and a slot (42, 52) defined therethrough, the shaft (32) located between the levers (40, 50), and the fastener (34) inserted through the slots (42, 52); and two pivot pins (23) respectively inserted in the pivot holes (41, 51) and the seat (20) to pivotally mount the levers (40, 50) in the seat (20).

2. The guitar as claimed in claim 1 further comprising two arcuate arms (43, 53) respectively provided at distal ends of the levers (40, 50).

3. The guitar as claimed in claim 1, wherein the tube (11) has an L-like shape.

* * * * *